Figure 1:
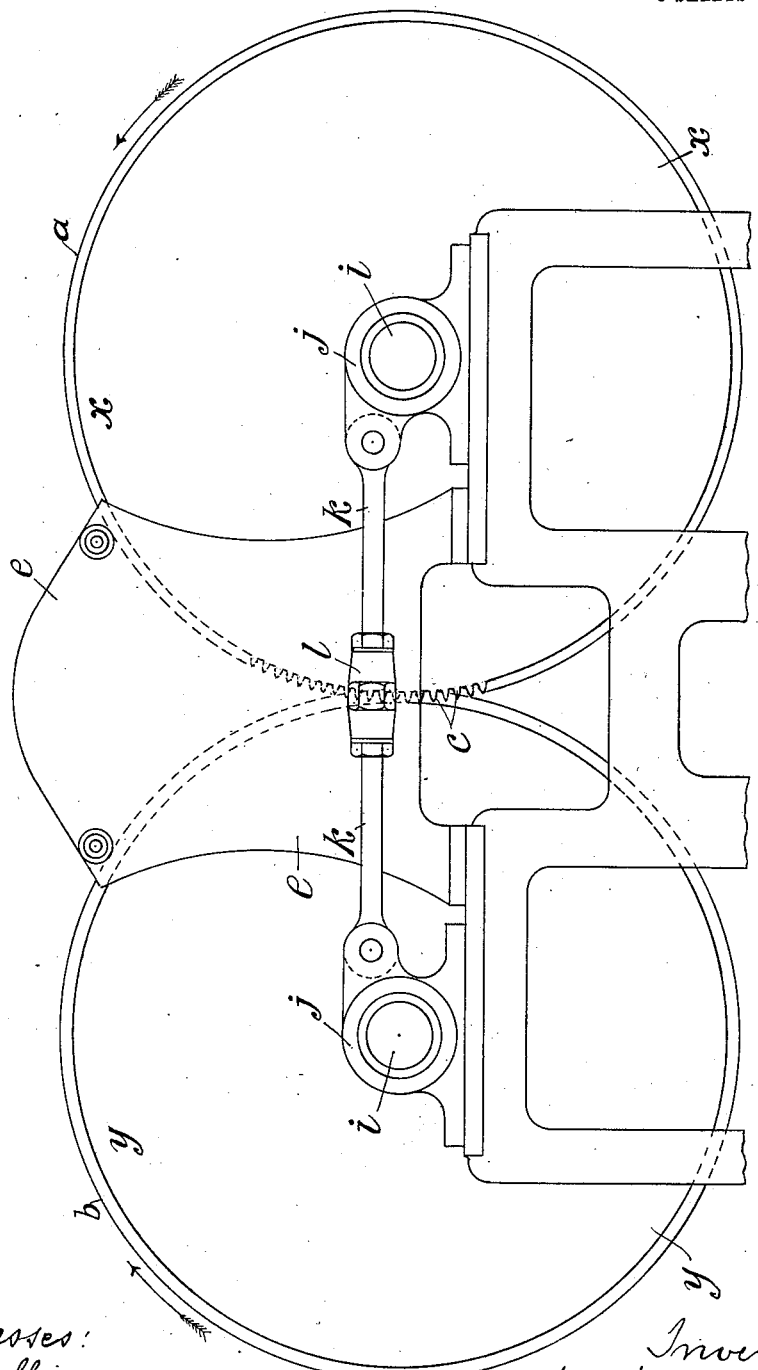

E. EVANS.
MANUFACTURE OF FEEDING CAKE.
APPLICATION FILED JUNE 24, 1909.

1,094,320.

Patented Apr. 21, 1914.
3 SHEETS—SHEET 1.

E. EVANS.
MANUFACTURE OF FEEDING CAKE.
APPLICATION FILED JUNE 24, 1909.

1,094,320.

Patented Apr. 21, 1914.

3 SHEETS—SHEET 3.

Witnesses:
E. Schallinger
C. Heymann

Inventor:
Ernest Evans
by B. Singer atty.

UNITED STATES PATENT OFFICE.

ERNEST EVANS, OF LISCARD, ENGLAND.

MANUFACTURE OF FEEDING-CAKE.

1,094,320.  Specification of Letters Patent.  Patented Apr. 21, 1914.

Application filed June 24, 1909. Serial No. 504,036.

*To all whom it may concern:*

Be it known that I, ERNEST EVANS, a subject of the King of England, residing at 2 Ivy Bank, Liscard Crescent, Liscard, in the county of Cheshire, England, have invented certain new and useful Improvements in and Connected with the Manufacture of Feeding-Cake, of which the following is a specification, reference being had therein to the accompanying drawings.

This invention relates generally to the manufacture of "feeding" cakes for animals; and while it has reference generally to such manufacture, it is especially suited and applicable to the manufacture of cakes which are partially divided, indented, or equivalently formed, so as to enable same to be produced in small pieces, or so as to be easily broken at or along the points of the partial division, indentation, or equivalent formation, into pieces of definite shape and size.

The primary object of this invention is to enable feeding cakes to be manufactured with greater rapidity, and at relatively small cost, while at the same time, to produce a cake of a good and serviceable character and quality; and a further object is to provide improvements in machinery for carrying out the method of manufacture as hereinafter described, which is of a simple and durable character.

The material, namely, the meal from which the cake is to be made, is introduced between continuously moving molds, which, as they move forward, compress the material into divisions, or partial divisions, the material being held up during the process of compression by divisions or projections on the moving surfaces, so that as the cake stuff moves forward, it cannot be expressed from the compartment or space within which it is contained, and is being compressed; and then after it has been compressed, it is delivered to and discharged from the molds or space into which it is compressed from below, by means as hereinafter described, in a continuous manner and form. But if desired, while the supply and delivery is continuous, as just described, the compressed and manufactured cake strip or band may be divided completely, or severed into lengths or sections, or it may be divided and delivered in pieces of small size, and of the desired shape. The surfaces of these drums or wheels are dried continuously by artificially heating them, as by making them hollow, and introducing steam or heating fluid into them, or circulating it through them; or by applying heat, as by gas heat, or heat produced by the combustion of any suitable fuel, which is applied to their interior surface, or by equivalent means; the effect of which is that the sticking of the meal to the surfaces of the drums, wheels, or either of them, which is liable sometimes to take place in machines as hitherto made, is completely prevented; and hence stoppages for the purpose of cleaning the drums or wheels are obviated, and the machine generally rendered more efficient.

In the following description of the method or process of the manufacture of feeding cakes, and of the machinery for effecting such manufacture, the improvements hereunder are comprised, but with regard to the invention specifically claimed as novel, this is set out in the statement of claim comprising the several claiming clauses concluding the specification.

In the annexed drawings, a machine for effecting the above purposes in the manner therein described, is illustrated.

Figure 2:
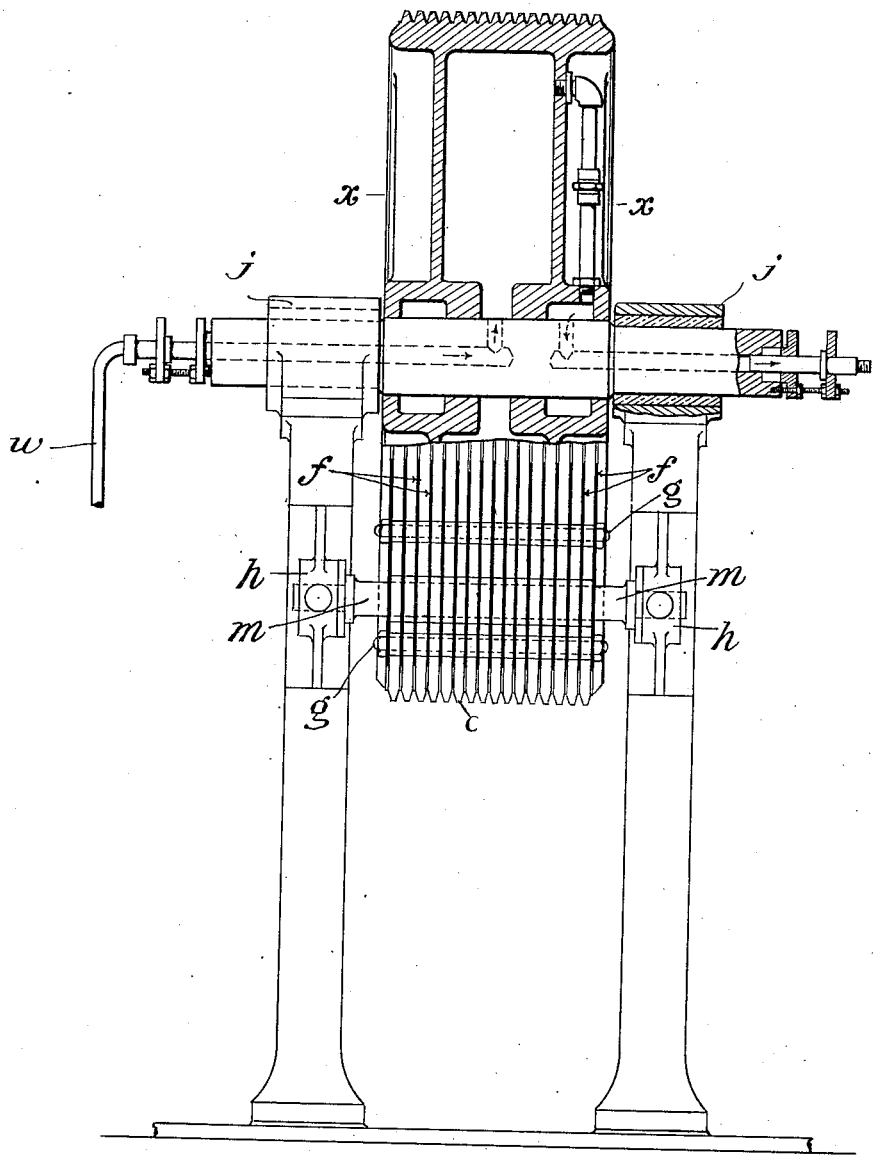
Figure 3:
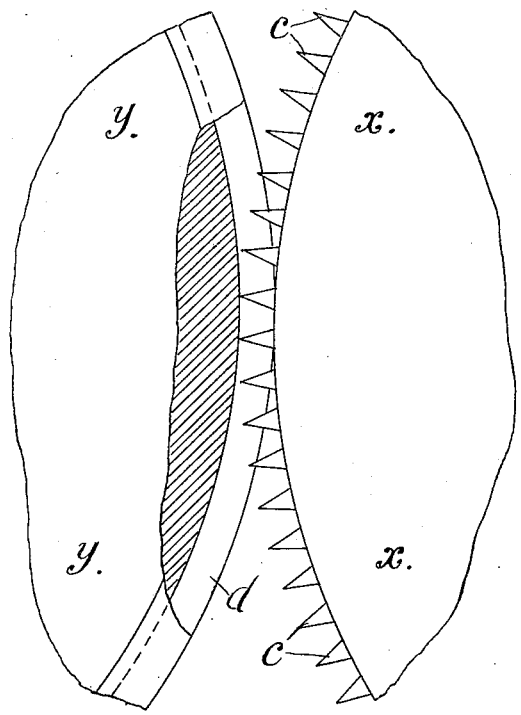
Figure 4:
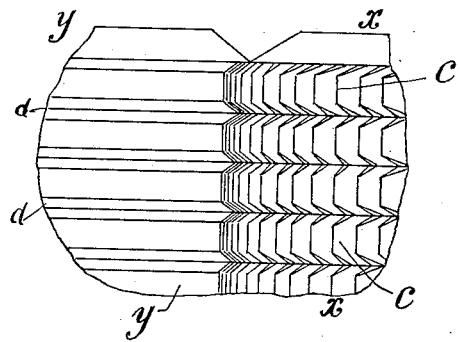

In these drawings, Figure 1 is a side elevation; and Fig. 2 is an end view of the same. Fig. 3 is a side elevation; and Fig. 4 a plan showing in detail parts of the cake forming portions of the machine.

In this machine there are a pair of surfaces $a$ and $b$ of circular or cylindrical form, that is, in the form of a pair of drums or wheels having a very considerable radius, say for instance 3 to 4 feet in diameter, one of such surfaces—namely the drum or wheel $x$—being provided with laterally arranged teeth or projections $c$, and the other surface—the drum or wheel $y$—with circumferentially arranged ribs or projections $d$, the lateral teeth $c$ on the surface $a$ being adapted to project between the circumferential projections $d$ on the other surface.

The substance to be compressed—meal or a mixture—is introduced in any suitable way into the space between the plates $e$, which are fitted on each side of the drums, and they constitute a species of hopper or container in contact with the compressing surfaces in which the substance is contained in more or less bulk. The surfaces of the drums or wheels $x$, $y$, which come in contact with the material to be formed into the cake, or the surface of the wheel or drum in which the cakes are pressed, and constitute the matrices for it, are or is dried continuously by artificially heating them or it, and this is effected in the machine shown in the drawing by introducing steam or hot fluids into the interior of the drums which are closed and hollow, and to which the fluid is introduced through journals or trunnions $i$ of the drums, which are hollow; but, as above stated, the heating of these surfaces may be effected in any other suitable way. By this means, the cakes in the matrices or recesses of the drum $y$ will part readily and cleanly from these surfaces, and the cake will be removed from them with a good, clean and smooth surface, without leaving any meal adhering in the angles or other parts.

The machine illustrated is adapted to wholly or partially divide the substance to constitute the cake into comparatively small portions, such as small cakes or pieces known as "cakettes", or the like. Of course, the distance of the surfaces $a$ and $b$ from one another will be determined by the thickness of the cake to be produced.

The teeth and ribs $c$, $d$, may be of any desired cross section, such for instance, they may be of even thickness throughout, or the bases of the teeth and ribs may be considerably thicker in proportion to the outer edges, as in the case shown in the drawings; and this edge may be more or less shaped, or it may be rounded, or equivalently shaped. Further, the depth of both the teeth and the ribs may vary, so that some may serve as means for partially dividing, indenting, or grooving the cake, while the others may serve as means for separating the substance.

By constructing the teeth $c$ and ribs $d$ with enlarged base or root portions, the substance which is caused to pass between the peripheral surfaces $a$, $b$, of the drums $x$, $y$, and is wholly or partially divided both laterally and longitudinally by such teeth and ribs, is compressed, and the degree of compression depends largely upon these root portions; while the leading teeth of the drum $x$, which is in advance of or on the discharge side of the section of material being compressed, and forms the transverse divisions, serves in the act of forming the cake as a support to the leading end of the cake sections. As regards the degree to which the compression of the substance can be carried, this will partly depend on the diameter of the drums $x$ and $y$, and the distance apart of the partitions or teeth $c$.

The compressed or manufactured indented or divided cakes are removed from the spaces or matrices of the wheel or drum $x$ in which they are pressed, by a comb device consisting of strips or plates $f$ of, say, thin steel, with inclined leading ends as shown, and placed with their inner edges lying on or next the face of the body of the said drum or wheel $x$, and in the bottom of the gaps in the parallel projecting parts or ribs $c$ referred to, so that as the wheels revolve, and the cake made comes in contact with the leading points of the teeth $f$ of the comb device, the cake is raised from the surface of the drum and out of the matrices, and ejected or removed. This comb device may be placed in such a position on the wheel—as in the case shown—just above the lower level of same, so that as the cakes are removed, they will fall directly into strips or lengths onto a conveyer disposed and running under the drum, and be conveyed thereby away and dealt with as desired. The comb teeth $f$ are connected together by bolts $g$ which pass through them, and have ferrules or distance pieces to keep the teeth at the right distance apart; and they are carried on a common shaft $m$, mounted in adjustable bearings $h$, by which they can be regulated and adjusted in relation to the wheel or drum $x$.

As a modification, instead of the removal of the cakes being effected by the comb device as described, the discharging may be effected by wires, cords, or the like, $u$, which pass around the drum $x$, and lie in the bottom of the gaps between the teeth $c$, and over a grooved pulley $t$ mounted on a shaft similarly to the shaft $m$, and similarly disposed in relation to the wheel $x$. As these wires or cords come away from the bottom of the gaps in their movement, they gradually press the cake from the molds similarly to the combs $f$, and deliver it onto a table, conveyer, or other place. The distance between the peripheral surfaces $a$ and $b$ of the drums may be adjustable; and in the case shown, this is effected by mounting the shafts $i$ of the drums $x$, $y$, in eccentric bearings $j$, coupled together by rods $k$, having a right and left hand adjusting nut or sleeve $l$ for moving them in one or other direction, as may be required. The drums $x$ and $y$ may be driven by toothed wheels, mounted in suitable frames and bearings.

What is claimed is:—

1. A machine for the manufacture of feeding cake comprising in combination, two adjacent moving members, the surface of one of which members has a plurality of laterally extending teeth with a plurality of gaps therein, and the surface of the other of said members having a plurality of continuous longitudinally extending ribs which take in the gaps in the laterally extending teeth, the continuous longitudinally extending ribs constituting side walls, the teeth as end walls, and the moving members on which the ribs and teeth are disposed constituting the superficial walls of the chambers in which the material is compressed.

2. Machinery for the manufacture of feeding cake, comprising a pair of rotatable drums; one of which has a plurality of laterally extending teeth each having a plurality of gaps therein, and the other of which has a plurality of continuous circumferential ribs, the drums being disposed close to each other with a comparatively small space between them, with the continuous ribs extending into the gaps in the teeth, the ribs serving as side walls and the teeth as end walls and forming with the drum surfaces a closed chamber of the space between the drum surfaces.

3. Machinery for the manufacture of feeding cake, comprising a pair of adjustable moving surfaces, one having a plurality of laterally extending teeth with a plurality of gaps therein, and the other having a plurality of continuous ribs thereon, the surfaces being arranged close to each other with a space between them with the ribs extending into the gaps in the teeth, and the teeth and ribs being of wedge form and serving as means for closing in the space between the surfaces and forming with the said surfaces, closed chambers of the spaces.

In testimony whereof I affix my signature in presence of two witnesses.

ERNEST EVANS.

Witnesses:
SOMERVILLE GOODALL,
DONALD COULTER.

---

Copies of this patent may be obtained for five cents each, by addressing the "Commissioner of Patents, Washington, D. C."